US008810642B2

(12) United States Patent
Tsukizawa et al.

(10) Patent No.: US 8,810,642 B2
(45) Date of Patent: Aug. 19, 2014

(54) PUPIL DETECTION DEVICE AND PUPIL DETECTION METHOD

(75) Inventors: Sotaro Tsukizawa, Kanagawa (JP); Kenji Oka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 318 days.

(21) Appl. No.: 13/318,431

(22) PCT Filed: Jan. 24, 2011

(86) PCT No.: PCT/JP2011/000359
§ 371 (c)(1),
(2), (4) Date: Nov. 1, 2011

(87) PCT Pub. No.: WO2011/105004
PCT Pub. Date: Sep. 1, 2011

(65) Prior Publication Data
US 2012/0050516 A1    Mar. 1, 2012

(30) Foreign Application Priority Data

Feb. 26, 2010    (JP) .................................. 2010-042455

(51) Int. Cl.
H04N 7/18         (2006.01)
G06K 9/00         (2006.01)
(52) U.S. Cl.
CPC .................... G06K 9/00604 (2013.01)
USPC ........................................................ 348/78
(58) Field of Classification Search
CPC .... A61B 3/113; A61B 3/145; G06K 9/00597; G06K 9/00604; H04N 5/23219
USPC ...................... 348/78; 351/210; 382/117, 118
See application file for complete search history.

(56) References Cited

U.S. PATENT DOCUMENTS

| 7,447,145 | B2 * | 11/2008 | Uchida .......................... 370/204 |
| 2006/0250218 | A1 * | 11/2006 | Kondo et al. .................. 382/117 |
| 2008/0151186 | A1 | 6/2008 | Adachi et al. |
| 2009/0185049 | A1 | 7/2009 | Takahashi |
| 2009/0278658 | A1 | 11/2009 | Higashiyama |

FOREIGN PATENT DOCUMENTS

| CN | 101185101 | 5/2008 |
| JP | 6-94980 | 4/1994 |
| JP | 7-319037 | 12/1995 |
| JP | 2008-158922 | 7/2008 |
| JP | 2009-171318 | 7/2009 |

OTHER PUBLICATIONS

English translation of Search Report for Chinese Patent Application No. 201180001860.1, mail date is Nov. 26, 2013.

* cited by examiner

Primary Examiner — Jorge L Ortiz Criado
Assistant Examiner — Daniel Chang
(74) Attorney, Agent, or Firm — Greenblum & Bernstein, P.L.C.

(57) ABSTRACT

In a pupil detection apparatus, based on a calculated value of red-eye occurrence intensity that is relative brightness of brightness within a first pupil image detected by a pupil detector with respect to brightness of a peripheral image outside the first pupil image, and a correlation characteristic of red-eye occurrence intensity and a pupil detection accuracy value, a switching selector selectively outputs a detection result of the first pupil image or a detection result of a second pupil image detected by a pupil detector. The pupil detection apparatus has a first imaging pair including an imager and an illuminator separated by a separation distance, and a second imaging pair whose separation distance is greater than that of the first imaging pair.

4 Claims, 15 Drawing Sheets

PUPIL DETECTION DEVICE AND PUPIL DETECTION METHOD

TECHNICAL FIELD

The present invention relates to a pupil detection apparatus and pupil detection method.

BACKGROUND ART

Pupil detection is performed in line of sight detection, expression detection, and so forth. If such pupil detection is performed when illuminance is low, a "red-eye phenomenon" occurs. This red-eye phenomenon occurs, in particular, due to blood vessels of the retina being photographed when flash photography is used while the pupils are dilated in a dark location or the like. Brightness with respect to a pupil periphery image of a pupil image in which the red-eye phenomenon occurs is greater than brightness with respect to a pupil periphery image of a normal pupil image in which the red-eye phenomenon does not occur. Therefore, under conditions in which the red-eye phenomenon occurs, it is difficult to perform stable pupil detection by applying a pupil detection method whose object is a normal pupil for which the red-eye phenomenon does not occur.

In response to this problem, a pupil detection method for use when the red-eye phenomenon occurs has heretofore been proposed (see Patent Literature 1, for example). In this pupil detection method, a pupil image in which the red-eye phenomenon has occurred is detected based on color saturation and brightness of the eye region.

CITATION LIST

Patent Literature

PTL 1
Japanese Patent Application Laid-Open No. 2009-171318

SUMMARY OF INVENTION

Technical Problem

However, in the above conventional pupil detection method, color saturation is used as a red-eye detection evaluation value. Therefore, if such pupil detection is applied to a gray scale image using near-infrared light, detection accuracy falls, or application is difficult from the start. Also, as stated above, a pupil detection result may be used in line of sight detection. Therefore, if pupil detection accuracy falls, the accuracy of processing in which a pupil detection result is used (for example, line of sight detection processing) will also fall.

It is an object of the present invention to provide a pupil detection apparatus and pupil detection method that enable a high-accuracy detection result to be selected and output even when a gray scale image using near-infrared light is used.

Solution to Problem

A pupil detection apparatus of the present invention is provided with: a first imaging pair composed of an imaging section and a light-emitting section that emits light at the time of imaging separated by a predetermined separation distance; a second imaging pair for which the predetermined separation distance is greater than that of the first imaging pair; a detection section that detects a first pupil image from a first person image in which a person is imaged by means of the first imaging pair, and detects a second pupil image from a second person image in which the person is imaged by means of the second imaging pair; and an output switching section that selectively outputs a detection result of the first pupil image or a detection result of the second pupil image, based on a calculated value of red-eye occurrence intensity that is relative brightness of brightness within the first pupil image with respect to brightness of a peripheral image outside the first pupil image, and a correlation characteristic of red-eye occurrence intensity and a pupil detection accuracy value.

A pupil detection method of the present invention is a pupil detection method in a pupil detection apparatus provided with a first imaging pair composed of an imaging section and a light-emitting section that emits light at the time of imaging separated by a predetermined separation distance, and a second imaging pair for which the predetermined separation distance is greater than that of the first imaging pair; wherein this pupil detection method has: a step of detecting a first pupil image from a first person image in which a person is imaged by means of the first imaging pair, and detecting a second pupil image from a second person image in which the person is imaged by means of the second imaging pair; and a step of selectively outputting a detection result of the first pupil image or a detection result of the second pupil image, based on a calculated value of red-eye occurrence intensity that is relative brightness of brightness within the first pupil image with respect to brightness of a peripheral image outside the first pupil image, and a correlation characteristic of red-eye occurrence intensity and a pupil detection accuracy value.

Advantageous Effects of Invention

According to the present invention, a pupil detection apparatus and pupil detection method can be provided that enable a high-accuracy detection result to be selected and output even when a gray scale image using near-infrared light is used.

DESCRIPTION OF EMBODIMENTS

Now, embodiments of the present invention will be described in detail with reference to the accompanying drawings. In the embodiments, identical configuration elements are assigned the same reference codes, and duplicate descriptions thereof are omitted.

Embodiment 1

Configuration of Pupil Detection Apparatus

Figure 1:
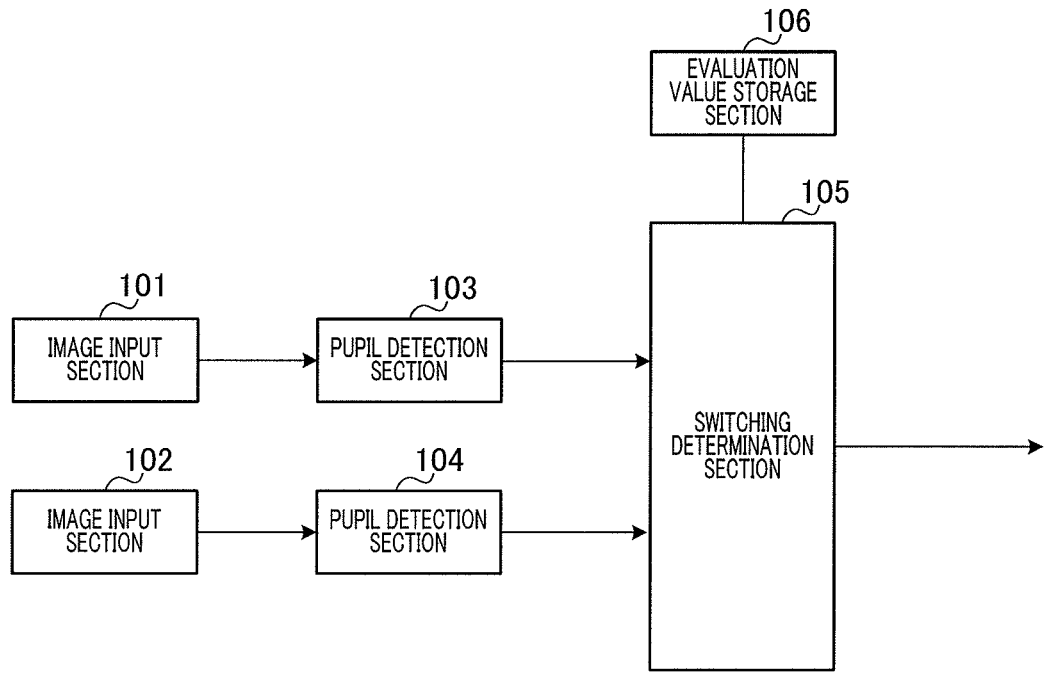
FIG. 1 is a block diagram showing a configuration of a pupil detection apparatus according to Embodiment 1 of the present invention.

FIG. 1 is a block diagram showing the configuration of pupil detection apparatus 100 according to Embodiment 1 of the present invention. Pupil detection apparatus 100 is, for example, installed in the passenger compartment of a vehicle, and used connected to an alarm apparatus. This alarm apparatus detects a line of sight of a driver based on a pupil detection apparatus 100 detection result, and alerts the driver with a warning if the driver does not look straight ahead for a long period of time. Below, a case in which pupil detection apparatus 100 is installed in the passenger compartment of a vehicle, in particular, will be described as an example.

In FIG. 1, pupil detection apparatus 100 has image input sections 101 and 102, pupil detection sections 103 and 104, switching determination section 105, and evaluation value storage section 106.

Image input sections 101 and 102 emit light and illuminate an imaging target (that is, here, a person), and image that imaging target. This target image data is output to pupil detection sections 103 and 104.

Figure 2:
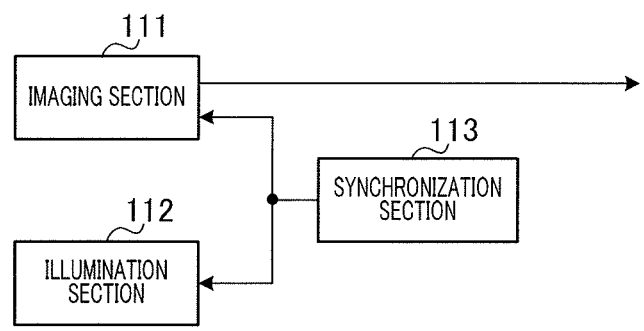
FIG. 2 is a block diagram showing a configuration of an image input section.

Specifically, image input section 101 has imaging section 111, illumination section 112, and synchronization section 113, as shown in FIG. 2.

Imaging section 111 images an imaging target at timing in accordance with a synchronization signal received from synchronization section 113, and outputs a target image signal to pupil detection section 103. Imaging section 111 is provided with a CCD (Charge-Coupled Device), CMOS (Complementary Metal Oxide Semiconductor), or suchlike image sensor.

Illumination section 112 emits light at timing in accordance with a synchronization signal received from synchronization section 113. Illumination section 112 is provided with an infrared LED. Infrared light emitted from this infrared LED is invisible, but is sensed by imaging section 111. That is to say, imaging section 111 has infrared sensitivity. If a sufficient amount of light for imaging is obtained, illumination section 112 may be on constantly rather than operating on synchronization pulse drive.

Synchronization section 113 controls illumination section 112 light emission timing and imaging section 111 exposure timing by outputting a synchronization signal to imaging section 111 and illumination section 112. By this means, an imaging target can be imaged at timing at which the imaging target is illuminated.

Figure 3:
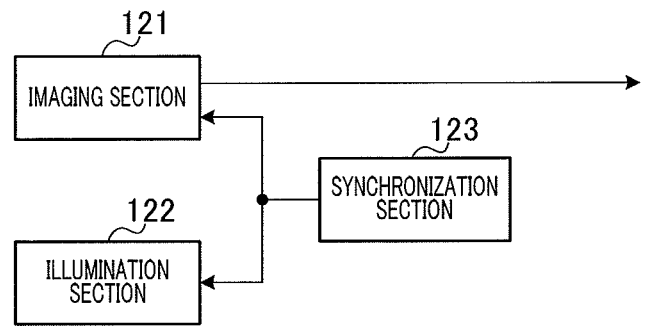
FIG. 3 is a block diagram showing a configuration of an image input section.

Image input section 102 has imaging section 121, illumination section 122, and synchronization section 123, as shown in FIG. 3. Imaging section 121, illumination section 122, and synchronization section 123 have the same functions as imaging section 111, illumination section 112, and synchronization section 113. However, separation distance d1 between imaging section 111 and illumination section 112 (that is, the distance from the optical axis of imaging section 111 to illumination section 112) is shorter than separation distance d2 between imaging section 121 and illumination section 122. That is to say, the red-eye phenomenon is more likely to occur in an image captured by imaging section 111 than in an image captured by imaging section 121.

Figure 4:
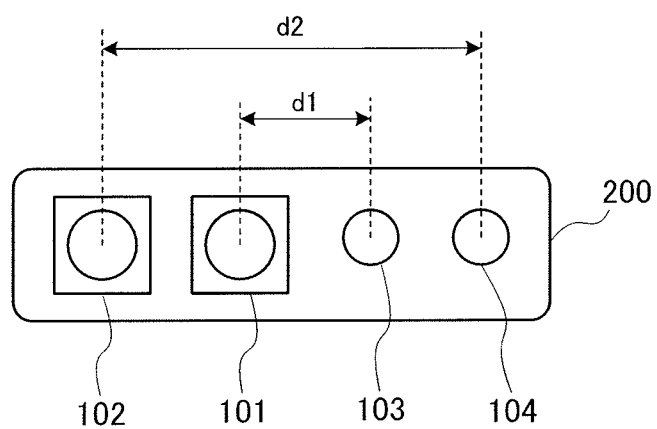
FIG. 4 is a block diagram showing a configuration of an imaging section.

Image input sections 101 and 102 having the above configuration form imaging unit 200 such as shown in FIG. 4, for example. Imaging unit 200 is installed directly in front of the driver's seat of a vehicle, such as above the steering wheel or on the dashboard. By this means, the driver's face is illuminated by illumination sections 112 and 122, and the driver's face is imaged by image input sections 101 and 102.

Returning to FIG. 1, pupil detection sections 103 and 104 detect a pupil image from a target image received from image input section 101 and a target image received from image input section 102.

Figure 5:
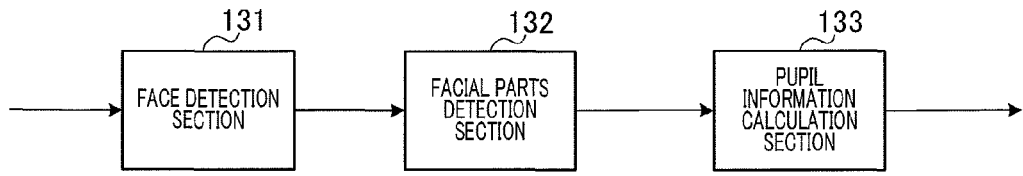
FIG. 5 is a block diagram showing a configuration of a pupil detection section.

Specifically, pupil detection section 103 has face detection section 131, facial parts detection section 132, and pupil information calculation section 133, as shown in FIG. 5.

Face detection section 131 detects a facial image from a target image received from image input section 101, and outputs facial image data to facial parts detection section 132.

Facial parts detection section 132 detects a facial parts group (that is, tail of the eye, inner corner of the eye, and so forth) from a facial image received from face detection section 131, and outputs position coordinates of each facial part to pupil information calculation section 133.

Based on the position coordinates of each facial part received from facial parts detection section 132, pupil information calculation section 133 calculates the center position of a pupil image and the size (that is, pupil diameter) of a pupil image. This pupil image center position and pupil image size are output to switching determination section 105, together with a target image output from image input section 101, as a pupil image detection result. A pupil image center position and pupil image size are calculated for the right eye and the left eye.

Figure 6:
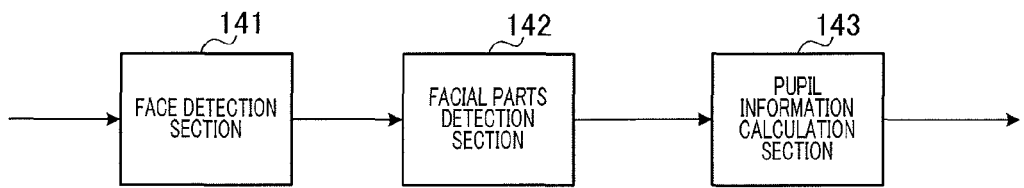
FIG. 6 is a block diagram showing a configuration of a pupil detection section.

As shown in FIG. 6, pupil detection section 104 has face detection section 141, facial parts detection section 142, and pupil information calculation section 143. Face detection section 141, facial parts detection section 142, and pupil information calculation section 143 have similar functions to face detection section 131, facial parts detection section 132, and pupil information calculation section 133. However, they differ in that data subject to processing is a target image input from image input section 102.

Returning to FIG. 1, switching determination section 105 calculates "red-eye occurrence intensity" from target image data received from image input section 101, and based on the calculated red-eye occurrence intensity and a correlation characteristic of red-eye occurrence intensity and a pupil detection accuracy rate, selects either a pupil detection section 103 pupil detection result or a pupil detection section 104 pupil detection result as a signal to be output to a later-stage processing section (for example, a line-of-sight calculation section).

Figure 7:
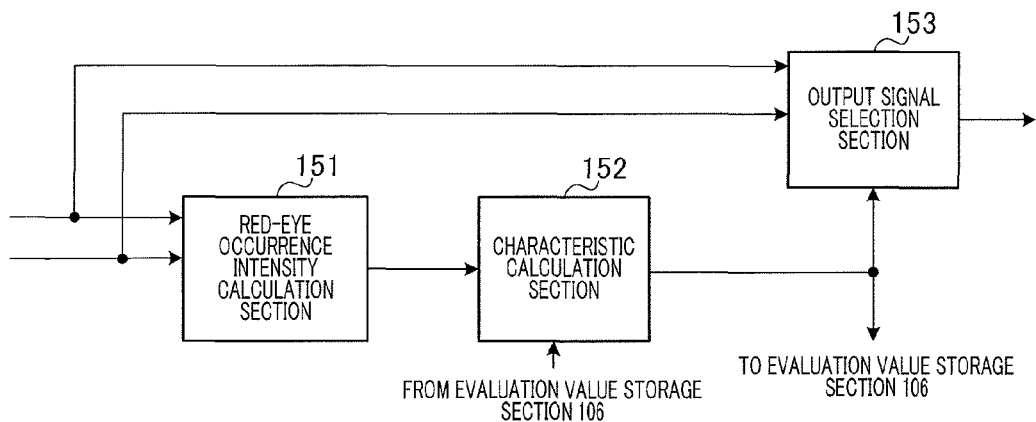
FIG. 7 is a block diagram showing a configuration of a switching determination section.

Specifically, switching determination section 105 has red-eye occurrence intensity calculation section 151, characteristic calculation section 152, and output signal selection section 153, as shown in FIG. 7.

Red-eye occurrence intensity calculation section 151 calculates red-eye occurrence intensity based on an input image and pupil image detection result. This red-eye occurrence intensity is calculated based on a target image and pupil image detection result received from pupil detection section 103. This red-eye occurrence intensity means "relative brightness" of brightness within a pupil image area with respect to a pupil image peripheral area located outside a pupil image area. This red-eye occurrence intensity will be described in detail later herein.

Characteristic calculation section 152 has data relating to a correlation characteristic of red-eye occurrence intensity and a pupil detection accuracy rate (that is, a pupil detection accuracy value) (hereinafter also referred to simply as "correlation characteristic data"). Characteristic calculation section 152 uses correlation characteristic data to calculate a pupil detection accuracy rate corresponding to red-eye occurrence intensity received from red-eye occurrence intensity calculation section 151. This calculated pupil detection accuracy rate is output to output signal selection section 153 and evaluation value storage section 106. Below, this calculated pupil detection accuracy rate may be referred to as "pupil detection reliability" in order to clearly distinguish it from a pupil detection accuracy rate in correlation characteristic data.

Based on a "variation trend characteristic" of pupil detection reliability received from characteristic calculation section 152, output signal selection section 153 selects either a pupil detection section 103 pupil detection result or a pupil detection section 104 pupil detection result as a signal to be output to a later-stage processing section (for example, a line-of-sight calculation section).

Specifically, a history of pupil detection reliabilities output from characteristic calculation section 152 in the past is stored in evaluation value storage section 106, and therefore output signal selection section 153 calculates a pupil detection reliability variation trend characteristic based on pupil detection reliability received from characteristic calculation section 152 this time and the pupil detection reliability history stored in evaluation value storage section 106. Then output signal selection section 153 selects either a pupil detection section 103 pupil detection result or a pupil detection section 104 pupil detection result based on the calculated variation trend characteristic, and outputs the selected pupil detection result to a later-stage processing section. This pupil detection reliability variation trend characteristic will be described in detail later herein.

Evaluation value storage section 106 stores pupil detection reliability received from switching determination section 105, associated with the capture time of a target image used in identification of the relevant pupil detection reliability.

[Operation of Pupil Detection Apparatus 100]

Figure 8:
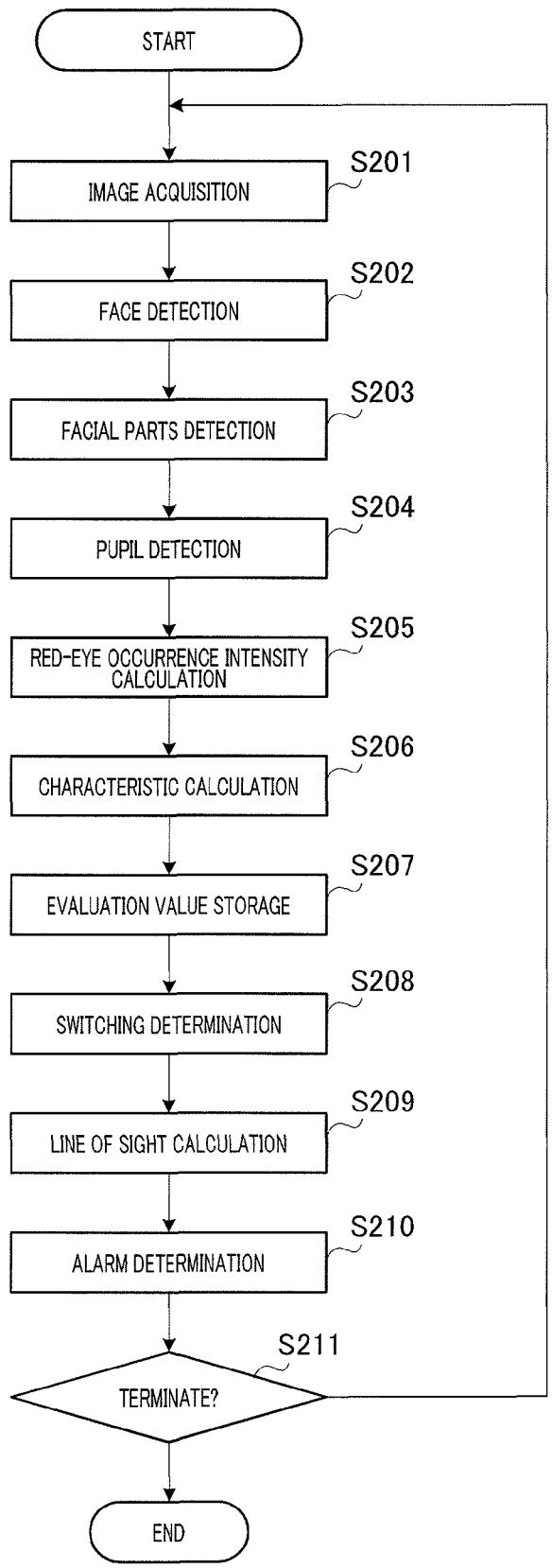
FIG. 8 is a flowchart provided to explain the operation of a pupil detection apparatus.

The operation of pupil detection apparatus 100 having the above configuration will now be described. FIG. 8 is a flowchart provided to explain the operation of pupil detection apparatus 100. The flowchart in FIG. 8 also includes the processing flow in the above-described alarm apparatus. That is to say, FIG. 8 shows the processing flow for a case in which pupil detection apparatus 100 is applied to an alarm apparatus.

The processing flow shown in FIG. 8 starts when an imaging operation is started. An imaging operation may be started by a user operation, or may be started by an external signal of some kind functioning as a trigger.

<Image Acquisition Processing>

In step S201, image input sections 101 and 102 emit light and illuminate an imaging target (that is, here, a person), and image that imaging target. By this means, target images are acquired.

Specifically, illumination section 112 of image input section 101 illuminates a target with invisible near-infrared light (for example, light with a wavelength of 850 nm). At the timing at which a target is illuminated, imaging section 111 images that target. Separation distance d1 between imaging section 111 and illumination section 112 is rather short (for example, 10 mm). Therefore, as ambient illuminance decreases, pupil diameter increases, and the red-eye phenomenon occurs in a target image captured by imaging section 111.

On the other hand, illumination section 122 of image input section 102 illuminates a target with invisible near-infrared light (for example, light with a wavelength of 850 nm) at different timing from illumination section 112. At the timing at which a target is illuminated by illumination section 122, imaging section 121 images that target. Separation distance d2 between imaging section 121 and illumination section 122 is greater than d1. Therefore, the probability of the red-eye phenomenon occurring in a target image captured by imaging section 121 is lower than for a target image captured by imaging section 111, and even if the red-eye phenomenon should occur, red-eye occurrence intensity will be lower. However, if red-eye occurrence intensity is sufficiently large, the brightness of a place where a pupil shines will reach the brightness upper limit of the image, and therefore the same red-eye phenomenon occurrence intensity may be observed in a target image captured by imaging section 111 and a target image captured by imaging section 121.

Digital cameras provided with a CMOS image sensor and lens, for example, are envisaged as imaging section 111 and imaging section 121. Therefore, PPM (Portable Pix Map file format) images or the like captured by imaging section 111 and imaging section 121 are temporarily stored in an image storage section such as PC memory space, for example (not shown) included in image input sections 101 and 102, and subsequently output to pupil detection sections 103 and 104 in the same PPM format.

<Pupil Detection Processing>

Figure 9B:
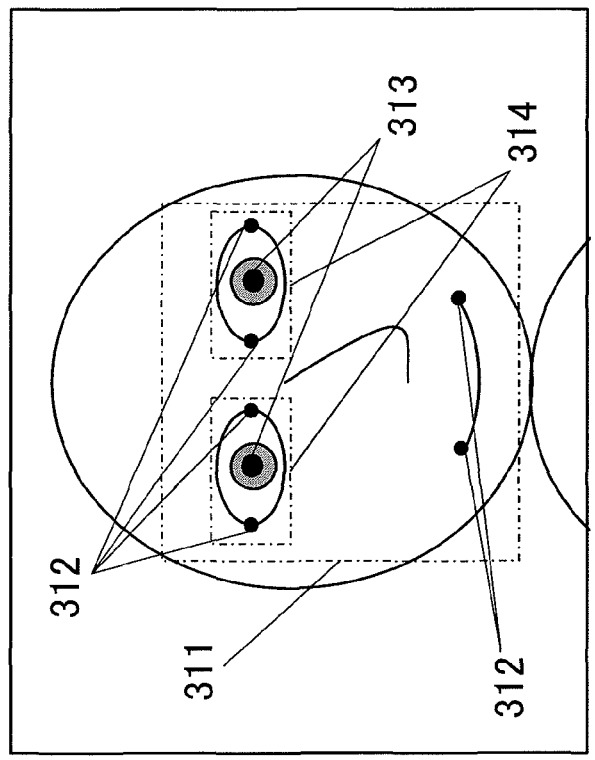
FIG. 9 comprises drawings showing a facial image that is a target image.
Figure 9A:
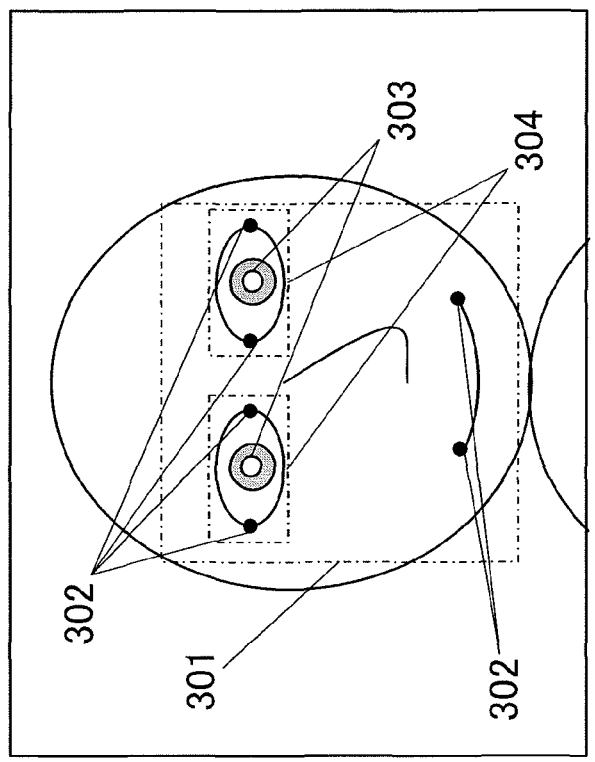

In step S202, face detection sections 131 and 141 detect facial images from target images received from image input sections 101 and 102. FIG. 9 comprises drawings showing a facial image that is a target image. FIG. 9A is a drawing showing an image when the red-eye phenomenon occurs, and FIG. 9A is a drawing showing an image when the red-eye phenomenon occurs, captured by imaging section 111, and FIG. 9B is a drawing showing an image when the red-eye phenomenon has not occurred, captured by imaging section 121. In the captured facial images, for example, the image horizontal direction is taken as the X-axis, the image vertical direction is taken as the Y-axis, and one pixel is one coordinate point.

In facial area detection processing, for example, a candidate of an image that is a feature (that is, a feature image candidate) is extracted, and feature image candidates of high similarity are detected by comparing an extracted feature image candidate with a feature image representing a facial area prepared beforehand. Similarity is found, for example, by comparing a Gabor feature amount of an average face acquired beforehand with a Gabor feature amount extracted by scanning an input image, and taking similarity to be the inverse of the absolute value of the difference between the two.

In this case, face detection section 131 identifies an area in the image in FIG. 9A with the highest correlation when compared with a previously prepare template as facial image 301. Facial image 311 is identified in a similar way in the image in FIG. 9B. Facial area detection processing may be performed by detecting a flesh-colored area from within an image (that is, by means of flesh-colored area detection), or may be performed by detecting an elliptical part (that is, by means of ellipse detection), or may be performed by using a statistical pattern recognition method. Furthermore, any other method may be used as long as it is a technology that enables the above-described face detection to be performed.

In step S203, facial parts detection sections 132 and 142 detect a facial parts group (that is, angle of mouth, tail of the eye, inner corner of the eye, and so forth) from facial images received from face detection sections 131 and 141, and output position coordinates of each facial part to pupil information calculation sections 133 and 143. The search range for facial parts is facial ranges 301 and 311 specified in step S202. FIGS. 9A and 9B show facial parts groups 302 and 312 respectively.

In facial parts group detection processing, for example, two-dimensional coordinates are detected for endpoints of facial parts such as the angle of mouth, tail of the eye, and inner corner of the eye, or nostrils and so forth. Provision may also be made for a learning device to learn beforehand correspondence relationships between a plurality of facial images and positions of facial parts corresponding to facial images, and, when facial images 301 and 311 are input, for facial parts detection sections 132 and 142 to detect a place where likelihood is highest with regard to those correspondence relationships as a facial part. Alternatively, facial parts detection sections 132 and 142 may search for facial parts from within facial images 301 and 311 using a standard facial parts template.

In step S204, facial parts detection sections 132 and 142 calculate the center position of a pupil image and the size (that is, pupil diameter) of a pupil image based on the position coordinates of each facial part received from facial parts detection sections 132 and 142.

In pupil detection processing, for example, a circular separability filter is applied to eye regions 304 and 314 that include tails of the eyes and inner corners of the eyes obtained in step S203. That is to say, when a circular separability filter application position is moved within eye regions 304 and 314, an area corresponding to a filter circle at a position where brightness separation is highest among positions where average brightness on the inner side of the filter circle is higher than average brightness on the outer side of the filter circle is detected as a pupil area (corresponding to areas 303 and 313 in FIGS. 9A and 9B). At this time, the center coordinates and diameter of a separability filter circle corresponding to a detected pupil are acquired as the center position of a pupil image and size of a pupil image.

<Switching Determination Processing>

In steps S205 through S208, switching determination section 105 calculates red-eye occurrence intensity from target image data received from image input section 101, and based on the calculated red-eye occurrence intensity and a correlation characteristic of red-eye occurrence intensity and a pupil detection accuracy rate, selects either a pupil detection section 103 pupil detection result or a pupil detection section 104 pupil detection result as a signal to be output to a later-stage processing section (for example, a line-of-sight calculation section).

Specifically, in step S205, red-eye occurrence intensity calculation section 151 calculates red-eye occurrence intensity based on an input image and pupil image detection results (that is, the pupil image center position and pupil image size).

Red-eye occurrence intensity V is calculated by means of equation 1 below. That is to say, red-eye occurrence intensity expresses how high brightness within a pupil is with respect to brightness around the pupil.

(Equation 1)

$$V = \frac{A1}{A2} \quad [1]$$

$$A1 = \frac{\sum_{P1} b}{N1}$$

$$A2 = \frac{\sum_{P2} b}{N2}$$

Figure 10:
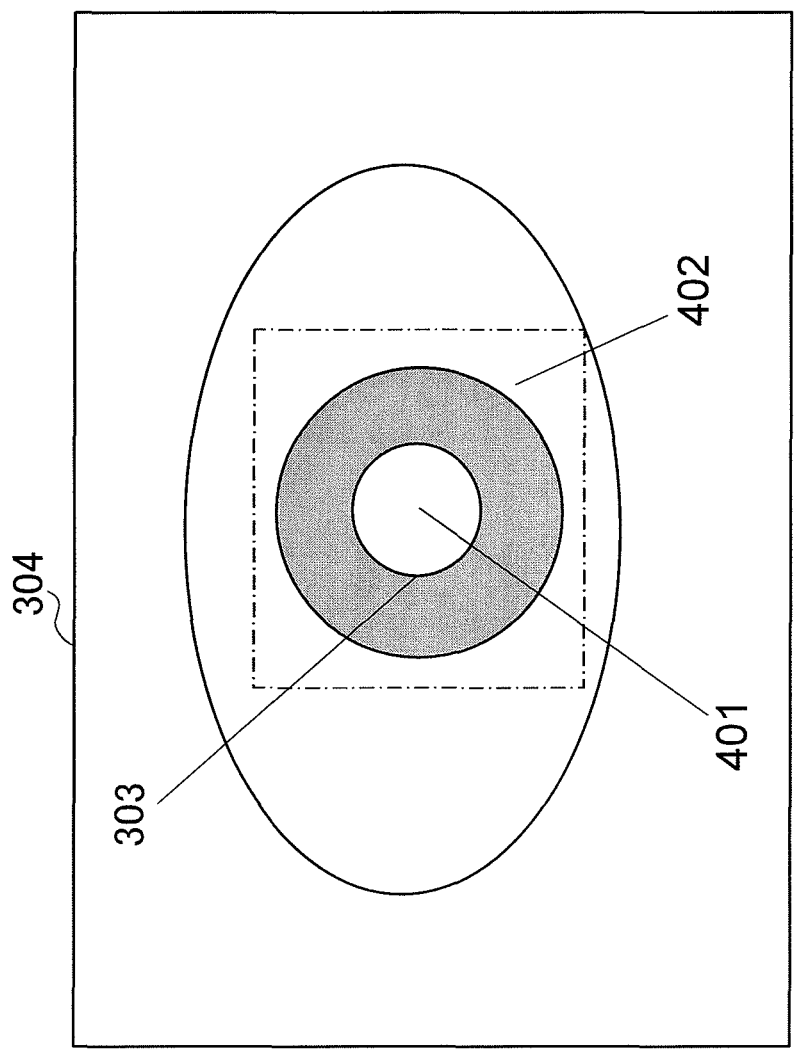
FIG. 10 is a drawing provided to explain red-eye occurrence intensity.

In equation 1, P1 is area 401 within eye region image 304 (314) shown in FIG. 10—that is, the internal area of area 401; P2 is area 402 within eye region image 304 (314) shown in FIG. 10—that is, the external area of area 401; b is the brightness of each pixel; N1 is the number of pixels present within P1; and N2 is the number of pixels present within P2.

This red-eye occurrence intensity is detected for target image and pupil image detection results received from pupil detection section 103.

In step S206, characteristic calculation section 152 uses correlation characteristic data to calculate a pupil detection accuracy rate corresponding to red-eye occurrence intensity received from red-eye occurrence intensity calculation section 151.

This correlation characteristic data is prepared beforehand by means of experimental data or a characteristic model, or the like. This correlation characteristic data represents a correlation characteristic of red-eye occurrence intensity and a pupil detection accuracy rate, and may be, for example, a graph in which experimental data is plotted with the horizontal axis as red-eye occurrence intensity and the vertical axis as a pupil detection accuracy rate, as shown in FIG. 11.

Figure 11:
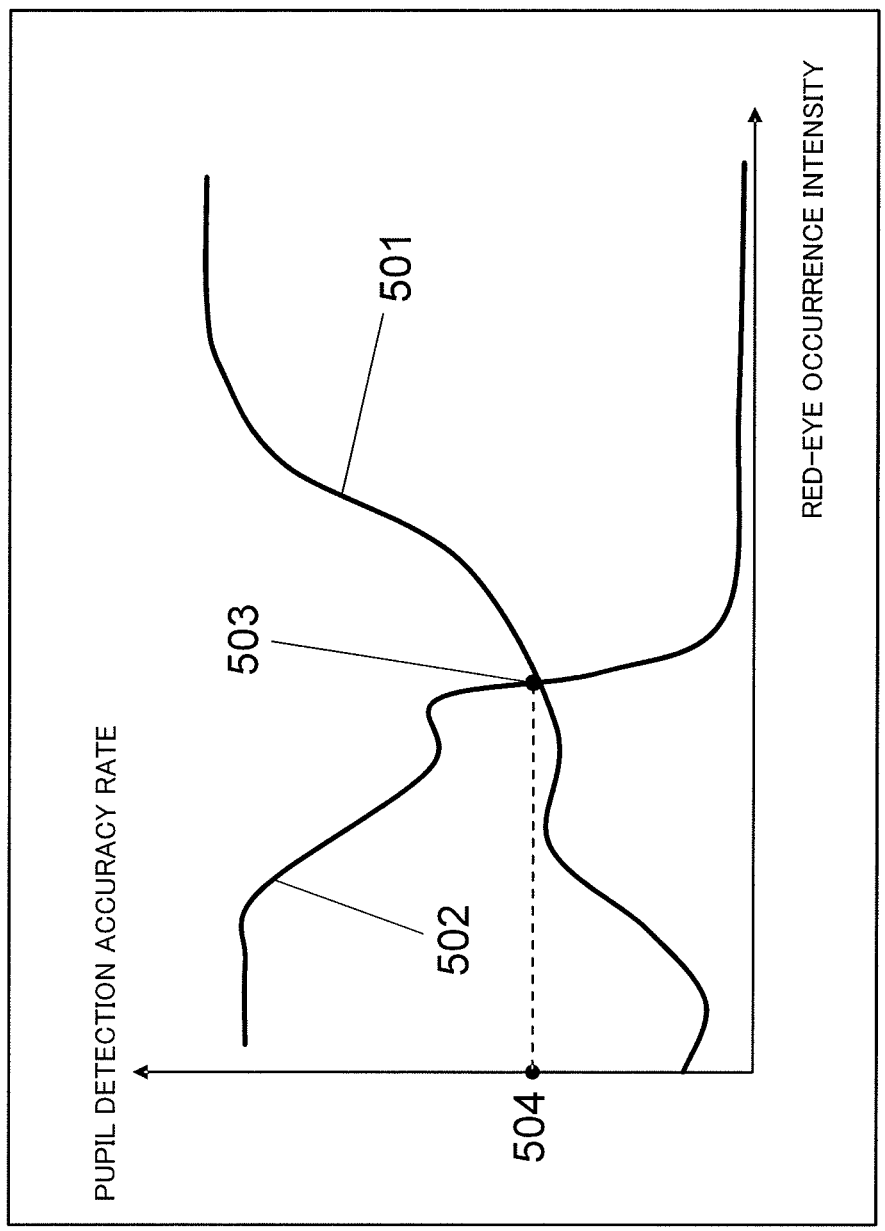
FIG. 11 is a drawing provided to explain a correlation characteristic of red-eye occurrence intensity and a pupil detection accuracy rate.

In FIG. 11, curve 501 represents correlation characteristic data when the red-eye phenomenon actually occurs. That is to say, curve 501 is a curve obtained from red-eye occurrence intensity found from a target image obtained by means of image input section 101. Curve 502 represents correlation characteristic data when the red-eye phenomenon has not occurred. That is to say, curve 502 is a curve obtained by plotting a pupil detection accuracy rate based on a target image obtained by means of image input section 102 in a certain environment against red-eye occurrence intensity found from a target image obtained by means of image input section 101 in the same environment.

Curve 501 and curve 502 intersect at intersection point 503, and a pupil detection accuracy rate corresponding to intersection point 503 is used as switching determination reference value 504. If red-eye occurrence intensity is greater than switching determination reference value 504, the reliability of a pupil detection section 103 pupil detection result is higher than that of a pupil detection section 104 pupil detection result. However, although a switching determination reference value is optimally an intersection point of two curves, even if it is not necessarily an intersection point—for example, if an intersection point pupil detection accuracy rate is higher than a predetermined permitted accuracy rate—this permitted accuracy rate may be used as a switching determination reference value. Alternatively, a pupil detection accuracy rate obtained by adding a predetermined value to, or subtracting a predetermined value from, a pupil detection accuracy rate at an intersection point of two curves may be used as a switching determination reference value.

In step S207, characteristic calculation section 152 stores pupil detection reliability in evaluation value storage section 106. Evaluation value storage section 106 stores pupil detection reliability received from switching determination section 105, associated with a capture time of a target image used for identification of that pupil detection reliability. However, if capture times and pupil detection reliabilities are sufficient in number with respect to a quantity necessary for processing in step S208 described later herein, evaluation value storage section 106 may perform deletion starting from the oldest capture time, and overwrite an area left vacant by the deletion with a newly acquired time and pupil detection reliability.

In step S208, output signal selection section 153 selects either a pupil detection section 103 pupil detection result or a pupil detection section 104 pupil detection result as a signal to be output to a later-stage processing section (for example, a line-of-sight calculation section), based on a "variation trend characteristic" of pupil detection reliability received from characteristic calculation section 152.

Specifically, output signal selection section 153 calculates a pupil detection reliability variation trend characteristic based on pupil detection reliability received from characteristic calculation section 152 this time and a pupil detection reliability history stored in evaluation value storage section 106.

Figure 12:
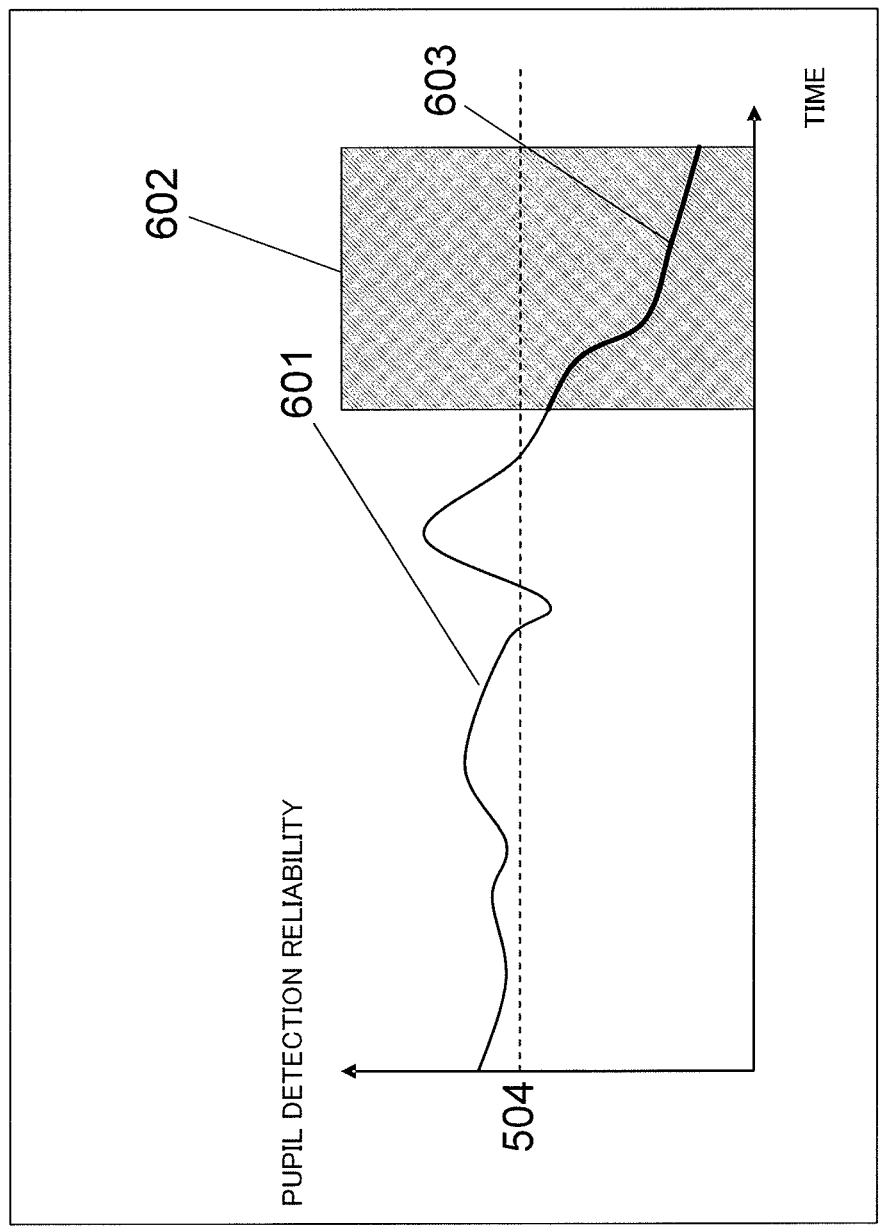
FIG. 12 is a drawing provided to explain a variation trend characteristic of red-eye occurrence intensity and a pupil detection accuracy rate.

FIG. 12 is a drawing showing a graph formed from pupil detection reliability received from characteristic calculation section 152 this time and a pupil detection reliability history stored in evaluation value storage section 106. In the graph, the horizontal axis is capture time and the vertical axis is pupil detection reliability. Here, actual pupil detection reliability values stored in evaluation value storage section 106 are used, but, for example, time-averaged values may be used, or time-averaged values excluding outliers may be used.

A pupil detection reliability variation trend characteristic is actually calculated as follows. First, output signal selection section 153 calculates the slope of time variation of pupil detection reliability at each capture time. Slope D1 of this pupil detection reliability time variation is calculated by means of equation 2 below.

(Equation 2)

$$D_1 = \frac{\partial E}{\partial t} \quad [2]$$

Here, E is pupil detection reliability, and t is a capture time.

Then output signal selection section 153 selects either a pupil detection section 103 pupil detection result or a pupil detection section 104 pupil detection result based on the calculated variation trend characteristic, and outputs the selected pupil detection result to a later-stage processing section.

The selection criteria here are as follows. Namely, if pupil detection reliability is smaller than switching determination reference value 504 and above slope $D_1$ is continuously negative (that is, pupil detection reliability decreases continuously) in a predetermined period (in FIG. 12, period 602), a pupil detection section 104 pupil detection result is selected. That is to say, a pupil detection section 104 pupil detection result is selected if pupil detection reliability curve 603 is lower than switching determination reference value 504 and is on a decreasing trend.

On the other hand, if pupil detection reliability is greater than switching determination reference value 504 and above slope $D_1$ is continuously positive (that is, pupil detection reliability increases continuously) in a predetermined period (in FIG. 12, period 602), a pupil detection section 103 pupil detection result is selected.

If neither of the above two criteria is satisfied, whichever pupil detection result—a pupil detection section 103 pupil detection result or a pupil detection section 104 pupil detection result—was selected the previous time is also selected this time. Pupil detection reliability curve 601 outside the predetermined period is a part that is not necessary for output signal selection section 153 processing. Therefore, evaluation value storage section 106 may delete data corresponding to this curve 601.

Here, generally, the higher the red-eye occurrence intensity, the higher is pupil brightness relative to iris brightness, making pupil detection easier in an image. Therefore, when the red-eye phenomenon occurs, detecting a pupil using an image obtained by means of image input section 101 gives better detection performance than if an image obtained by means of image input section 102 is used. However, if red-eye occurrence intensity is low, the difference between pupil brightness and iris brightness decreases. Consequently, in a situation in which occurrence of the red-eye phenomenon is likely to begin, there is almost no difference between pupil brightness and iris brightness in an image obtained by means of image input section 101, and pupil detection becomes difficult. On the other hand, in an image obtained by means of image input section 102, red-eye phenomenon occurrence is still weaker than in an image obtained by means of image input section 101, and therefore a pupil does not shine and pupil brightness becomes quite low relative to iris brightness. Consequently, in an image obtained by means of image input section 102, the difference between pupil brightness and iris brightness becomes greater than in an image obtained by means of image input section 101, and detection performance becomes relatively good. Since the comparative accuracy of a pupil detection section 103 pupil detection result and pupil detection section 104 pupil detection result is reversed according to red-eye occurrence intensity in this way, the accuracy of later-stage processing can be improved by appropriate selection of the result with the better accuracy.

<Line-of-Sight Calculation Processing>

In step S209, a line-of-sight calculation section (not shown in the drawings) calculates a line of sight from facial parts group coordinates obtained in step S203 and pupil image center coordinates obtained in step S204.

A line of sight is calculated, for example, from a face orientation vector representing the frontal direction orientation calculated from facial parts group coordinates, and a line-of-sight vector for the frontal direction of a face calculated from tail of the eye, inner corner of the eye, and pupil center coordinates.

A face orientation vector is calculated by means of the following procedure, for example. First, the line-of-sight calculation section converts three-dimensional coordinates of a facial parts group of a driver acquired beforehand by rotating and translating them. Then the line-of-sight calculation section projects the converted three-dimensional coordinates onto a target image used to obtain the pupil detection result selected in step S208. Then the line-of-sight calculation section calculates rotation and translation parameters most closely matching the facial parts group detected in step S203. At this time, when three-dimensional coordinates of a facial parts group of a driver are acquired beforehand, the combination of a vector representing the direction in which the driver's face is oriented and a vector rotated by means of a decided rotation parameter is a face orientation vector.

A line-of-sight vector is calculated by means of the following procedure, for example. First, when a face is oriented in a predetermined direction, the line-of-sight calculation section stores beforehand a driver's facial parts group when looking in the same direction as the face orientation and pupil center three-dimensional coordinates. Next, a position moved by a predetermined distance from the three-dimensional coordinates of a detected pupil in the opposite direction to the line of sight is calculated as an eyeball center position. At this time, an appropriate above predetermined distance is about 12 mm, the radius of a typical adult eyeball, but the predetermined distance is not limited to this, and any value may be used for this distance. Next, the three-dimensional coordinates of an eyeball center at the time of detection are found using the face rotation and translation parameters acquired at the time of face orientation vector calculation. Then there is assumed to be a pupil on a sphere whose radius is the above predetermined distance, with the eyeball center as the center, and where the detected pupil center is on the above ball is found. Lastly, a vector linking the eyeball center to the found point on the sphere is calculated as a line of sight.

<Alarm Determination Processing>

In step S210, an alarm apparatus (not shown in the drawings) determines whether or not the driver is looking straight ahead from the line of sight obtained in step S209, and executes alarm processing based on the determination result. That is to say, if the line of sight is directed outside a predetermined angular range for a predetermined time or longer, an alarm is generated. This alarm is a display that includes a warning message, a speech message generated by a speech synthesis LSI, LED light emission, a sound from a speaker or the like, or a combination of these.

Specifically, in the event of determining that the driver is not looking straight ahead, the alarm apparatus increments alarm count W by 1. Then, if alarm count W exceeds a predetermined threshold value, the alarm apparatus considers that the driver has not looked straight ahead for a long period of time, and issues an alarm. In the event of determining that the driver is looking straight ahead, the alarm apparatus makes alarm count W zero. Alarm count W is zero in the initial state.

In step S211, termination determination is performed, and if a termination condition has been satisfied, the series of processing steps is terminated. On the other hand, if the termination condition has not been satisfied, the processing flow returns to step S201. Here, termination determination may be performed by manual input of a termination command, or may be performed by means of an external signal of some kind functioning as a trigger.

As described above, according to this embodiment, in pupil detection apparatus 100, switching determination section 105 selectively outputs a detection result of a first pupil image detected by pupil detection section 103 or a detection result of a second pupil image detected by pupil detection section 104, based on a calculated value of red-eye occurrence intensity that is relative brightness of brightness within the first pupil image with respect to brightness of a peripheral image outside the first pupil image, and a correlation characteristic of red-eye occurrence intensity and a pupil detection accuracy value.

In pupil detection section 103, a first person image is used that is captured by means of image input section 101 provided with imaging section 111 and illumination section 112 whose mutual separation distance is d1. On the other hand, in pupil detection section 104, a second person image is used that is captured by means of image input section 102 provided with imaging section 121 and illumination section 122 whose mutual separation distance is d2. Separation distance d1 is smaller than separation distance d2.

By this means, of a first pupil image detection result and a second pupil image detection result, an optimal pupil image detection result can be selectively output according to imaging conditions based on an accuracy estimate of pupil detection using a first pupil image in which the red-eye phenomenon is comparatively likely to occur. Also, since red-eye occurrence intensity that is relative brightness of brightness within the first pupil image with respect to brightness of a peripheral image outside the first pupil image, unrelated to color saturation, is used as a selection parameter, a high-accuracy detection result can be selected and output even when a gray scale image using near-infrared light is used.

Embodiment 2

In Embodiment 2, a pupil detection result is selected based on an illuminance coefficient in addition to calculated red-eye occurrence intensity and a correlation characteristic of red-eye occurrence intensity and a pupil detection accuracy rate.

Figure 13:
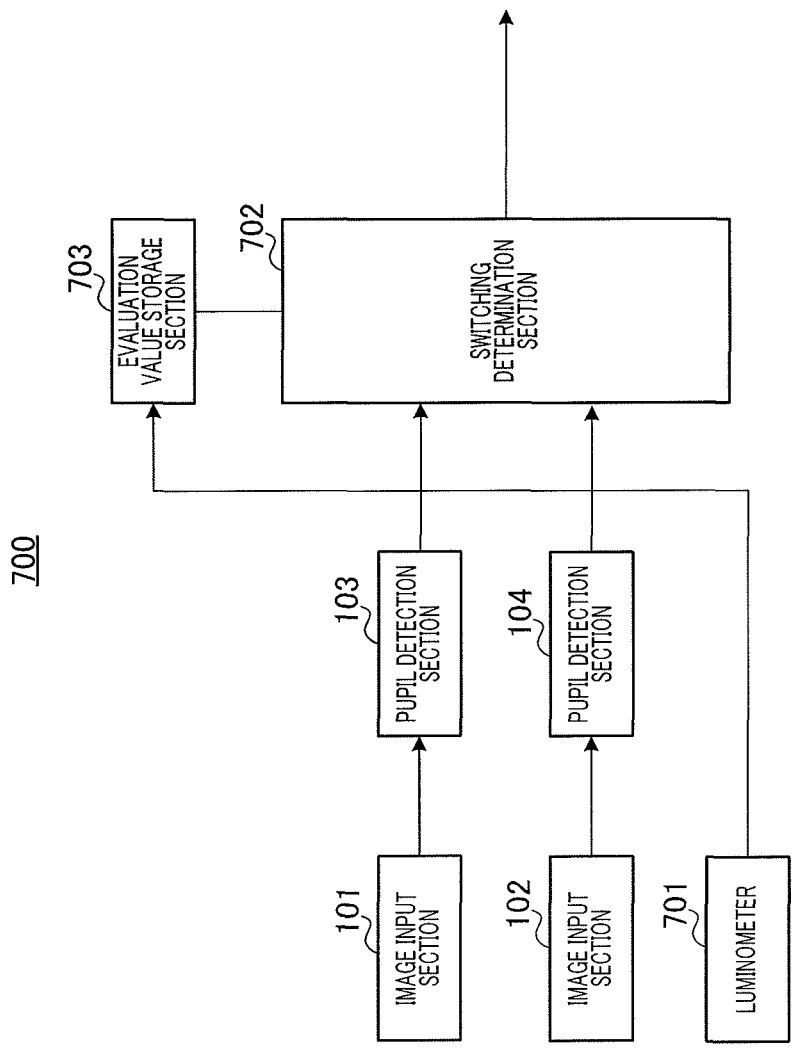
FIG. 13 is a block diagram showing a configuration of a pupil detection apparatus according to Embodiment 2 of the present invention.

FIG. 13 is a block diagram showing the configuration of pupil detection apparatus 700 according to Embodiment 2 of the present invention. In FIG. 13, pupil detection apparatus 700 has luminometer 701, switching determination section 702, and evaluation value storage section 703.

Luminometer 701 measures illuminance at the time of imaging by image input sections 101 and 102, and outputs measured illuminance to evaluation value storage section 703. Luminometer 701 is installed in the vicinity of a driver's face, or in a position where it can measure illuminance in a driver's gaze direction.

Switching determination section 702 calculates "red-eye occurrence intensity" from target image data received from image input section 101 and target image data received from image input section 102, and based on the calculated red-eye occurrence intensity and a correlation characteristic of red-eye occurrence intensity and a pupil detection accuracy rate, selects either a pupil detection section 103 pupil detection result or a pupil detection section 104 pupil detection result as a signal to be output to a later-stage processing section (for example, a line-of-sight calculation section).

Figure 14:
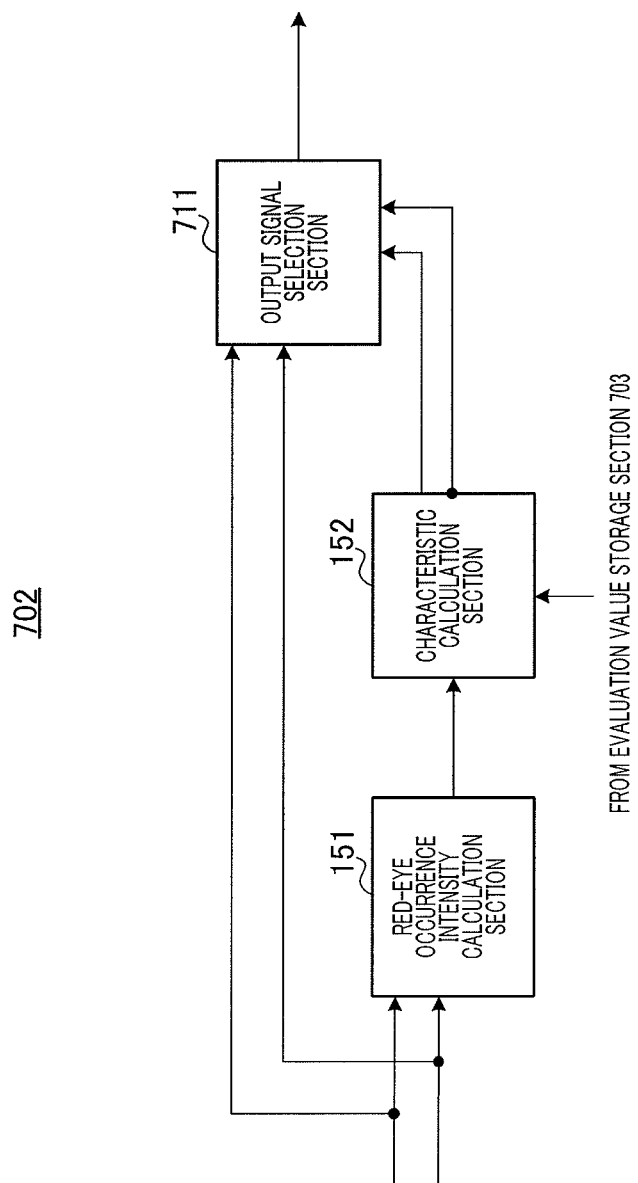
FIG. 14 is a block diagram showing a configuration of a switching determination section.

Specifically, switching determination section 702 has output signal selection section 711, as shown in FIG. 14. Output signal selection section 711 corrects pupil detection reliability received from characteristic calculation section 152 based on illuminance, and selects either a pupil detection section 103 pupil detection result or a pupil detection section 104 pupil detection result as a signal to be output to a later-stage processing section (for example, a line-of-sight calculation section) based on a "variation trend characteristic" of post-correction pupil detection reliability. This correction of pupil detection reliability based on illuminance will be described in detail later herein.

Evaluation value storage section 703 stores pupil detection reliability received from switching determination section 702 and illuminance received from luminometer 701, associated with the capture time of a target image used in identification of the relevant pupil detection reliability.

Figure 15:
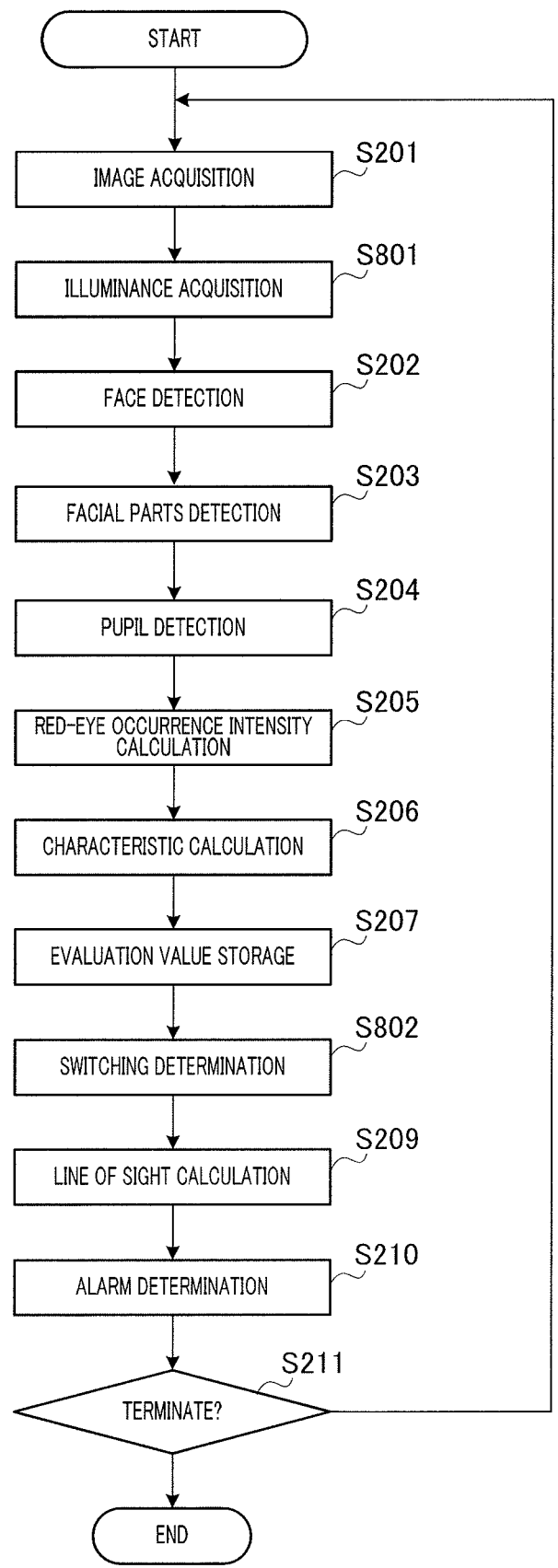
FIG. 15 is a flowchart provided to explain the operation of a pupil detection apparatus.

The operation of pupil detection apparatus 700 having the above configuration will now be described. FIG. 15 is a flowchart provided to explain the operation of pupil detection apparatus 700.

In step S801, luminometer 701 measures illuminance at the time of imaging by image input sections 101 and 102. A position subject to illuminance measurement is optimally around the driver's face or in the driver's gaze direction, but is not limited to these, and illuminance may also be outside a vehicle in which pupil detection apparatus 700 is installed, for example.

In step S802, switching determination section 702 calculates "red-eye occurrence intensity" from target image data received from image input section 101 and target image data received from image input section 102, and based on the calculated red-eye occurrence intensity, a correlation characteristic of red-eye occurrence intensity and a pupil detection accuracy rate, and measured illuminance, selects either a pupil detection section 103 pupil detection result or a pupil detection section 104 pupil detection result as a signal to be output to a later-stage processing section (for example, a line-of-sight calculation section).

Specifically, output signal selection section 711 corrects pupil detection reliability received this time from characteristic calculation section 152 and pupil detection reliability stored in evaluation value storage section 703 based on illuminance. This correction is performed by means of equation 3 below. That is to say, illuminance-reflecting pupil detection reliability F is calculated by multiplying pupil detection reliability E by illuminance coefficient L.

[3]

$$F = L \cdot E \quad \text{(Equation 3)}$$

Figure 16B:
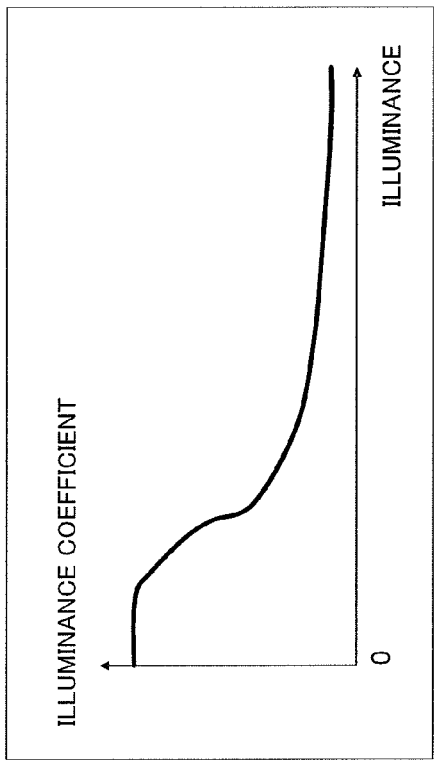
FIG. 16 comprises drawings showing a correspondence relationship between illuminance and an illuminance coefficient.
Figure 16A:
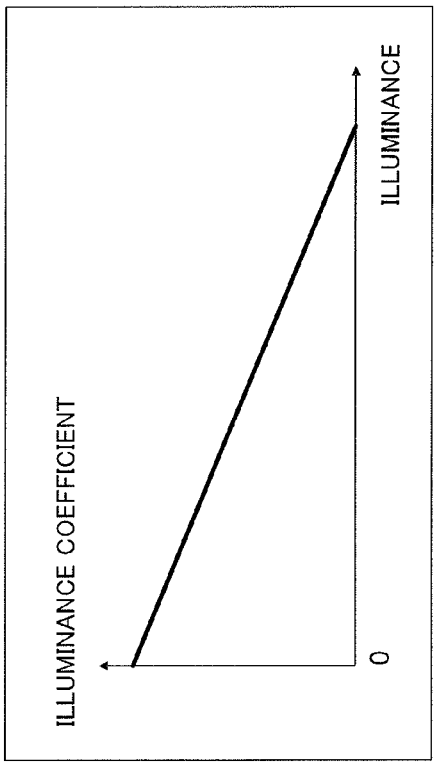

FIG. 16 shows correspondence relationships between illuminance and an illuminance coefficient. As shown in FIG. 16, illuminance coefficient L is set so as to decrease as illuminance increases. Two examples are shown in FIGS. 16A and 16B, but usable correspondence relationships between illuminance and an illuminance coefficient are not limited to these. Any kind of correspondence relationship may be used as long as the slope of an illuminance coefficient with respect to illuminance does not become positive.

Then output signal selection section 711 selects either a pupil detection section 103 pupil detection result or a pupil detection section 104 pupil detection result as a signal to be output to a later-stage processing section (for example, a line-of-sight calculation section), based on a variation trend characteristic of post-correction pupil detection reliability (that is, illuminance-reflecting pupil detection reliability F).

At this time, slope D2 of illuminance-reflecting pupil detection reliability F time variation found by variation trend characteristic calculation is found by means of equation 4 below.

(Equation 4)

$$D_2 = \frac{\partial F}{\partial t} \quad [4]$$

Then output signal selection section 711 selects either a pupil detection section 103 pupil detection result or a pupil detection section 104 pupil detection result based on the calculated variation trend characteristic and illuminance, and outputs the selected pupil detection result to a later-stage processing section.

Specifically, if illuminance is greater than or equal to a predetermined value within above predetermined period 602, output signal selection section 711 selects a pupil detection section 103 pupil detection result.

On the other hand, if illuminance is less than or equal to a predetermined value within above predetermined period 602, output signal selection section 711 selects either a pupil detection section 103 pupil detection result or a pupil detection section 104 pupil detection result based on the calculated variation trend characteristic, and outputs the selected pupil detection result to a later-stage processing section.

The selection criteria here are as follows. Namely, if pupil detection reliability is smaller than switching determination reference value 504 and above slope $D_2$ is continuously negative (that is, pupil detection reliability decreases continuously) in a predetermined period (in FIG. 12, period 602), a pupil detection section 104 pupil detection result is selected. That is to say, a pupil detection section 104 pupil detection result is selected if pupil detection reliability curve 603 is lower than switching determination reference value 504 and is on a decreasing trend.

On the other hand, if pupil detection reliability is greater than switching determination reference value 504 and above slope $D_2$ is continuously positive (that is, pupil detection reliability increases continuously) in a predetermined period (in FIG. 12, period 602), a pupil detection section 103 pupil detection result is selected.

If neither of the above two criteria is satisfied, whichever pupil detection result—a pupil detection section 103 pupil detection result or a pupil detection section 104 pupil detection result—was selected the previous time is also selected this time.

As described above, according to this embodiment, in pupil detection apparatus 700, output signal selection section 711 corrects a variation trend characteristic based on illuminance at the time of imaging, and selects a detection result of a first pupil image or a detection result of a second pupil image based on the post-correction variation trend characteristic.

By this means, a first pupil image detection result or second pupil image detection result can be selected based on selection criteria that more accurately reflect imaging conditions.

Embodiment 3

In Embodiment 3, correlation characteristics corresponding to a plurality of modes are prepared, and pupil detection reliability is calculated based on a correlation characteristic corresponding to a selected mode.

Figure 17:
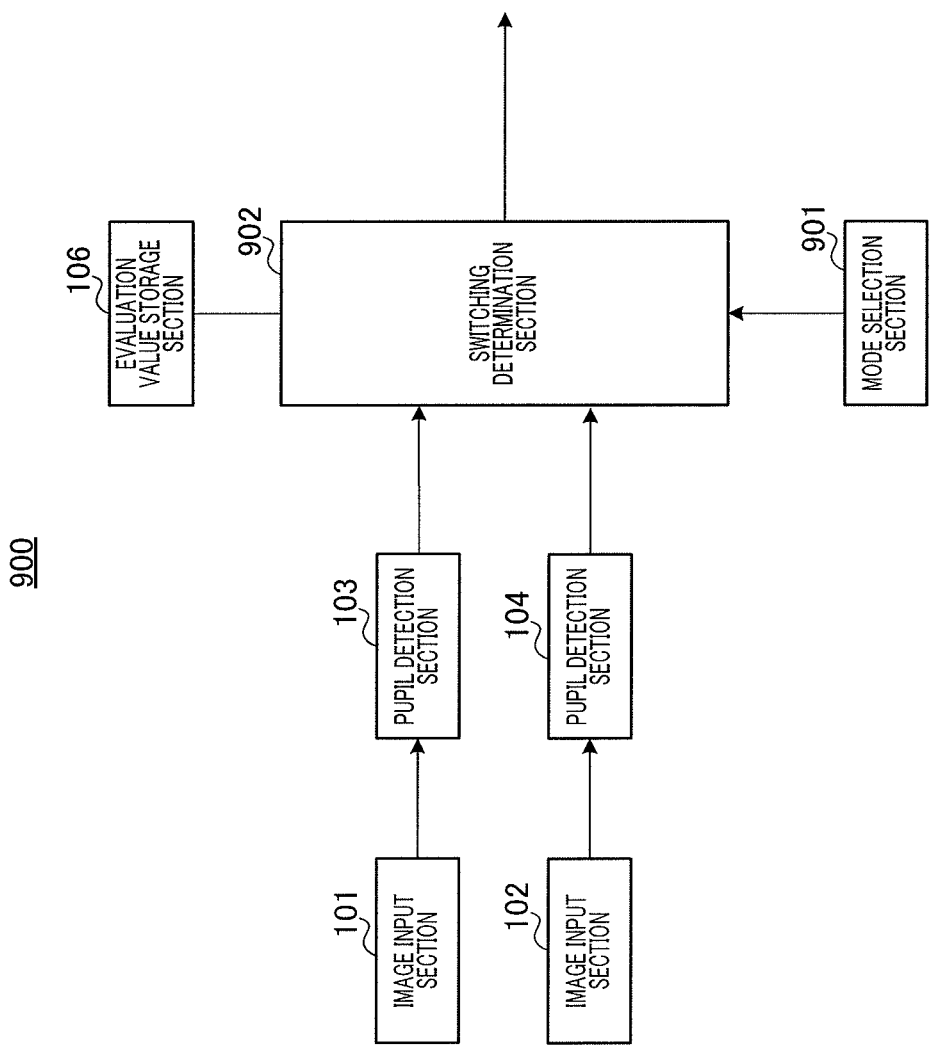
FIG. 17 is a block diagram showing a configuration of a pupil detection apparatus according to Embodiment 3 of the present invention.

FIG. 17 is a block diagram showing the configuration of pupil detection apparatus 900 according to Embodiment 3 of the present invention. In FIG. 17, pupil detection apparatus 900 has mode selection section 901 and switching determination section 902.

Mode selection section 901 selects one mode from among a prepared plurality of modes. This plurality of modes includes, for example, a first mode in which a target person is wearing sunglasses and a second mode in which a target person is not wearing sunglasses. Information relating to the selected mode is output to switching determination section 902.

Switching determination section 902 calculates "red-eye occurrence intensity" from target image data received from image input section 101 and target image data received from image input section 102, and based on the calculated red-eye occurrence intensity and a correlation characteristic of red-eye occurrence intensity and a pupil detection accuracy rate, selects either a pupil detection section 103 pupil detection result or a pupil detection section 104 pupil detection result as a signal to be output to a later-stage processing section (for example, a line-of-sight calculation section). Here, an optimal correlation characteristic of red-eye occurrence intensity and a pupil detection accuracy rate varies according to the mode. Therefore, switching determination section 902 switches the correlation characteristic used for pupil detection result selection according to mode information received from mode selection section 901.

Figure 18:
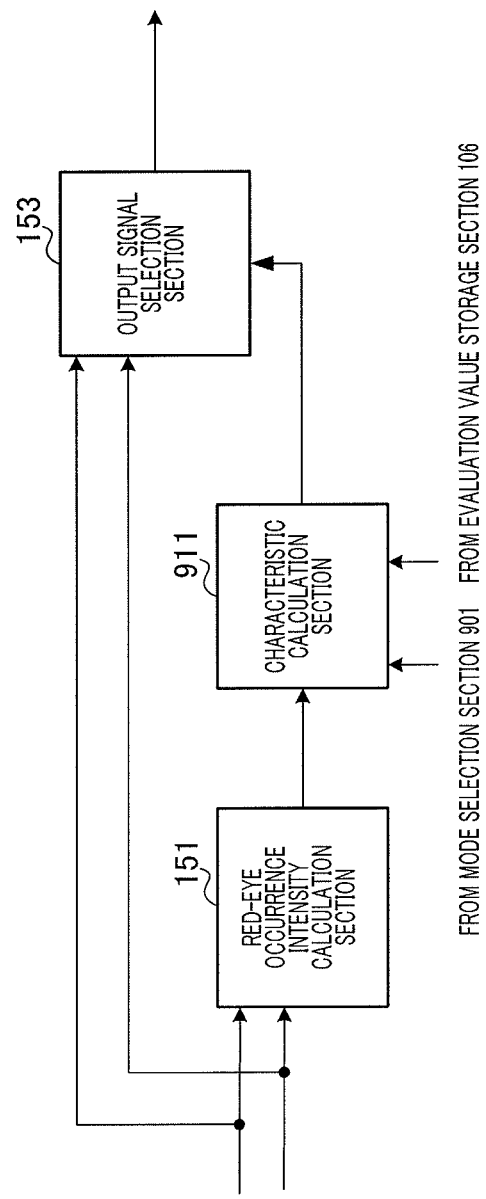
FIG. 18 is a block diagram showing a configuration of a switching determination section.

Specifically, switching determination section 902 has characteristic calculation section 911 as shown in FIG. 18. Characteristic calculation section 911 has correlation characteristic data corresponding to each of a plurality of modes that can be selected by mode selection section 901. Mode selection section 901 then selects correlation characteristic data corresponding to mode information received from mode selection section 901, and uses that correlation characteristic data to calculate a pupil detection accuracy rate corresponding to red-eye occurrence intensity received from red-eye occurrence intensity calculation section 151.

Since a pupil detection result is selected using an optimal correlation characteristic for each mode in this way, a high-accuracy pupil detection result can be selected with a high degree of accuracy.

Figure 19A:
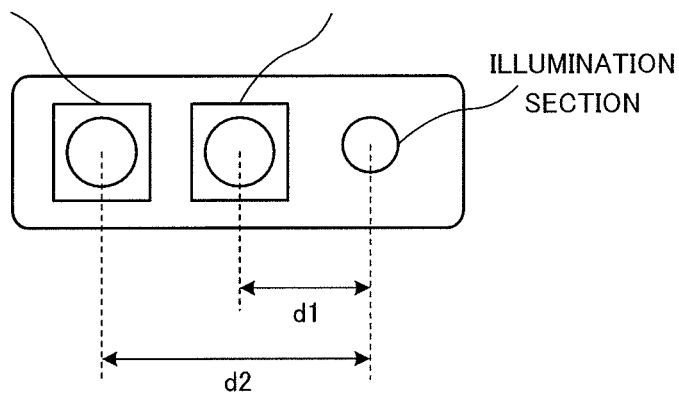
FIG. 19 is a drawing showing configuration variations of an image input section.
Figure 19B:
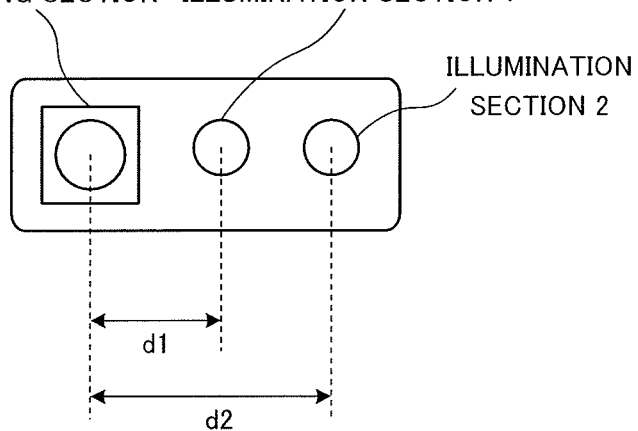

Other Embodiments (1) In the above embodiments, cases have been described in which an imaging section and an illumination section are provided individually for image input section 101 and image input section 102. However, the present invention is not limited to this. For example, pupil detection apparatus 100 may have a configuration provided with an imaging unit comprising two imaging sections and one illumination section (see FIG. 19A). Conversely, pupil detection apparatus 100 may have a configuration provided with an imaging unit comprising one imaging section and two illumination sections (see FIG. 19B). The essential point is that an imaging section and illumination section form a pair, and there are two pairs with different separation distances between an imaging section and illumination section.

(2) In the above embodiments, cases have been described by way of example in which the present invention is configured as hardware, but it is also possible for the present invention to be implemented by software. Also, the function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration. Moreover, the method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used. Furthermore, in the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosure of Japanese Patent Application No. 2010-042455, filed on Feb. 26, 2010, including the specification, drawings and abstract, is incorporated herein by reference in its entirety.

INDUSTRIAL APPLICABILITY

A pupil detection apparatus and pupil detection method of the present invention are useful in enabling a high-accuracy detection result to be selected and output even when a gray scale image using near-infrared light is used.

REFERENCE SIGNS LIST

100, 700, 900 Pupil detection apparatus
101, 102 Image input section
103, 104 Pupil detection section
105, 702, 902 Switching determination section
106, 703 Evaluation value storage section
111, 121 Imaging section
112, 122 Illumination section
113, 123 Synchronization section
131, 141 Face detection section
132, 142 Facial parts detection section
133, 143 Pupil information calculation section
151 Red-eye occurrence intensity calculation section
152, 911 Characteristic calculation section
153, 711 Output signal selection section
200 Imaging unit
701 Luminometer
901 Mode selection section

The invention claimed is:

1. A pupil detection apparatus comprising:
a first imaging pair comprising an imager and a light-emitter that emits light at a time of imaging, the imager and the light-emitter being separated by a first predetermined separation distance;
a second imaging pair comprising an imager and a light-emitter separated by a second predetermined separation distance, which is greater than the first predetermined separation distance of the first imaging pair;
a detector that detects a first pupil image from a first person image in which a person is imaged by the first imaging pair, and detects a second pupil image from a second person image in which the person is imaged by the second imaging pair;
an accuracy value calculator that calculates a first red-eye occurrence intensity, which is relative brightness of brightness within the first pupil image with respect to brightness of a peripheral image outside the first pupil image, and a second red-eye occurrence intensity, which is relative brightness of brightness within the second pupil image with respect to brightness of a peripheral image outside the second pupil image, and, based on a correlation characteristic between the calculated first and second red-eye occurrence intensities and a pupil detection accuracy value, calculates pupil detection accuracy values corresponding to the calculated first and second red-eye occurrence intensities;
a selector that selectively outputs a detection result of the first pupil image or a detection result of the second pupil image based on a variation trend characteristic of the calculated pupil detection accuracy values;
wherein the selector selects the detection result of the first pupil image when all the calculated pupil detection accuracy values in a predetermined period are less than a predetermined threshold value, and a time variation trend of the calculated pupil detection accuracy values is an unrelievedly decreasing variation trend characteristic; and wherein the predetermined threshold value is a pupil detection accuracy value corresponding to a point at which a first correlation characteristic between the calculated first red-eye occurrence intensity and a first pupil detection accuracy value of the first pupil image, and a second correlation characteristic between the calculated second red-eye occurrence intensity and a second pupil detection accuracy value of the second pupil image, intersect.

2. The pupil detection apparatus according to claim 1, further comprising a corrector that corrects the variation trend characteristic based on illuminance at the time of imaging, wherein the selector selects the detection result of the first pupil image or the detection result of the second pupil image based on a variation trend characteristic after the correction.

3. A pupil detection method in a pupil detection apparatus provided with a first imaging pair including an imager and a light-emitter that emits light at a time of imaging, the imager and the light-emitter being separated by a first predetermined separation distance, and a second imaging pair including an imager and a light-emitter separated by a second predetermined separation distance, which is greater than the first predetermined separation distance of the first imaging pair, the pupil detection method comprising:

detecting a first pupil image from a first person image in which a person is imaged by the first imaging pair, and a second pupil image from a second person image in which the person is imaged by the second imaging pair;

calculating a first red-eye occurrence intensity, which is relative brightness of brightness within the first pupil image with respect to brightness of a peripheral image outside the first pupil image, and a second red-eye occurrence intensity that is relative brightness of brightness within the second pupil image with respect to brightness of a peripheral image outside the second pupil image;

calculating, based on a correlation characteristic between the calculated first and second red-eye occurrence intensities and a pupil detection accuracy value, pupil detection accuracy values corresponding to the calculated first and second red-eye occurrence intensities; and selectively outputting a detection result of the first pupil image or a detection result of the second pupil image based on a variation trend characteristic of the calculated pupil detection accuracy values;

selecting the detection result of the first pupil image when all the calculated pupil detection accuracy values in a predetermined period are less than a predetermined threshold value, and a time variation trend of the calculated pupil detection accuracy values is an unrelievedly decreasing variation trend characteristic; and wherein the predetermined threshold value is a pupil detection accuracy value corresponding to a point at which a first correlation characteristic between the calculated first red-eye occurrence intensity and a first pupil detection accuracy value of the first pupil image, and a second correlation characteristic between the calculated second red-eye occurrence intensity and a second pupil detection accuracy value of the second pupil image, intersect.

4. The pupil detection apparatus according to claim 1, wherein the variation trend characteristic of the calculated pupil detection accuracy values indicates a slope of time variation of the pupil detection accuracy values.

* * * * *